Sept. 19, 1961  F. W. YOUNG  3,000,507
ROTARY FILTER
Filed June 19, 1957  4 Sheets-Sheet 1

INVENTOR.
FRANK W. YOUNG
BY
Kenway, Jenney, Witter & Hildreth
ATTORNEYS

Sept. 19, 1961 F. W. YOUNG 3,000,507
ROTARY FILTER
Filed June 19, 1957 4 Sheets-Sheet 2

INVENTOR.
FRANK W. YOUNG

Sept. 19, 1961   F. W. YOUNG   3,000,507
ROTARY FILTER
Filed June 19, 1957   4 Sheets-Sheet 3

INVENTOR.
FRANK W. YOUNG
BY
Kenway, Jenney, Witter & Hildreth
ATTORNEYS

Sept. 19, 1961  F. W. YOUNG  3,000,507
ROTARY FILTER
Filed June 19, 1957  4 Sheets-Sheet 4
Fig. 7
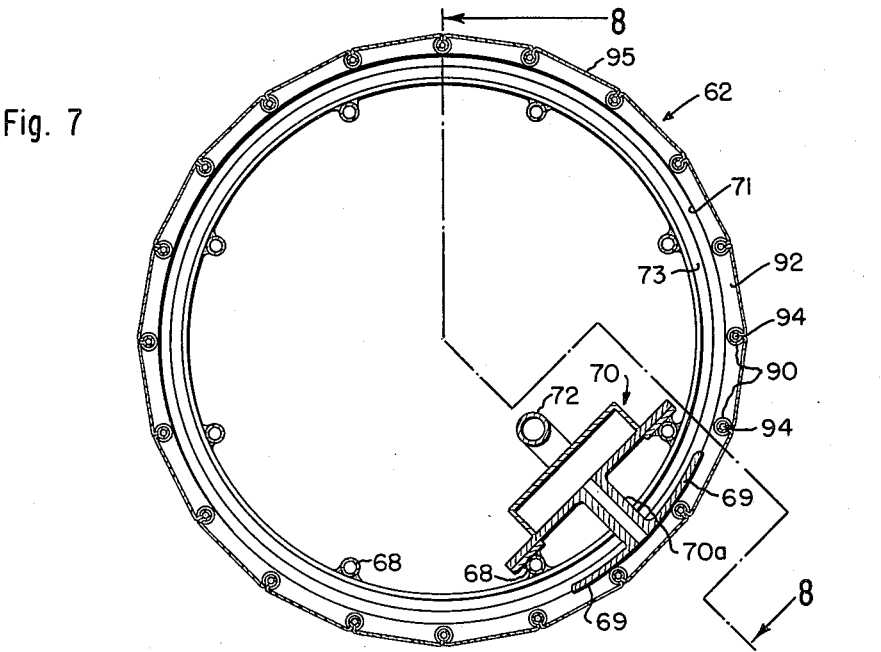
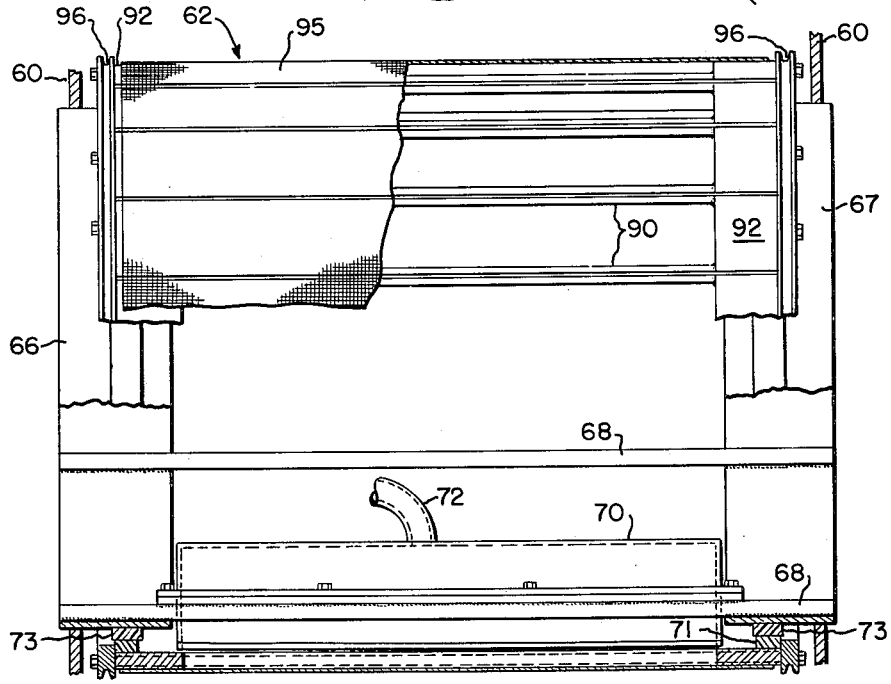
Fig. 8
INVENTOR.
FRANK W. YOUNG
BY
Kenway, Jenney, Witter & Hildreth
ATTORNEYS

3,000,507
ROTARY FILTER
Frank W. Young, 211 North St., Medfield, Mass.
Filed June 19, 1957, Ser. No. 666,738
5 Claims. (Cl. 210—402)

This invention relates to rotary drum-type filters and comprises in particular an improved and novel construction employing a hollow cylindrical shell and associated stationary internal head members having outer surface regions in contact with an inner bearing surface of the shell.

Rotary filters of this general type are well-known in the art and have generally been constructed in the form of a drum having a surface adapted for filtration. By rotating the drum in a slurry or other fluid medium to be filtered while maintaining its interior at a low pressure, filtrate is drawn into the drum, while a filter cake of the solids builds up on the filter surface. As the drum continues to rotate the filter cake is carried from the slurry and may be stripped from the drum surface which then re-enters the slurry to continue the filtration.

Generally rotary filters of this type are constructed with one or more separate internal stationary chambers to permit the collection of one or more filtrate or wash water fractions separately from the main body of filtrate. For instance, it is frequently desirable to collect the initial filtrate permeating the clean section of the filter surface separately from the bulk of filtrate since the initial filtrate is often cloudy. For this purpose an initial filtrate chamber at the inside of the drum opposite where its surface first enters the slurry and provided with a separate vacuum connection is often provided. Similarly, wash water sprayed on the cake after its emergence from the drum may be collected in a separate chamber appropriately located inside the drum.

A separate stationary chamber adjacent the area where the cake is stripped from the drum is also generally provided to be maintained under an elevated pressure whereby a blowback is created to assist in the removal of the filter cake.

The general practice has been to mount the drum on hollow trunnions through which must pass all the conduits entering the drum, including those leading to or from the several chambers within the drum, as well as the primary supporting structure for the several internal chambers. The limitations thus imposed by the necessity of centrally extending everything within the drum has not only imposed difficult construction problems but has also prevented the location of several of the conduits at an optimum location.

The present invention avoids these limitations and difficulties by utilizing as the principal filter member a hollow cylindrical entirely open ended shell having a surface adapted for filtration. The shell is provided at its ends with stationary head members which may additionally serve as supporting structure for the shell. The head members are formed with outer cylindrical surfaces contacting the inner surface of the shell, and are joined by longitudinal struts or blades having outer surface portions substantially co-cylindrical with the head members and which therefore contact or lie in close proximity to, the inner surface of the shell.

In preferred embodiments which include one or more internal chambers, the longitudinal blades may serve to define the edges of the walls of the chambers adjacent to the inside surface of the shell and also serve to support the chambers in their desired locations.

With a construction of this type numerous advantages are realized, particularly with regard to the mounting and positioning of the chambers and with regard to the location of the conduits entering the inside of the shell, each of which may be placed at the position to best serve the intended purpose. The filtrate outlet conduit, for instance, may be located near the bottom of the filter to facilitate the maintaining of a low filtrate level so that full advantage of the pressure head of slurry outside the filter shell can be taken. The blowback line may be located adjacent the blowback chamber and the initial filtrate line may be located to drain downwardly away from the chamber in which the initial filtrate, together with considerable air, is drawn. The air entering this chamber has, in prior art constructions in which the chamber must drain upwardly to the level of the central trunnion, caused numerous difficulties which may be entirely avoided by rotary filters embodying this invention.

A further important advantage of the rotary filter of this invention lies in the access available to the interior of the cylinder. The stationary heads may be so arranged that all conduits enter and leave through one of them, leaving the other free for purposes of entry to the interior of the cylinder. Moreover, because central location of the internal structure will be generally avoided, with the various interior chambers and conduits restricted to locations near the inside surface of the cylinder, the central portion is open so as not to interfere with a person entering and working within the cylinder.

In the following description from which will appear further advantages, as well as other features of this invention, some presently preferred embodiments selected for purposes of illustration are explained in detail with reference to the drawings in which:

FIG. 7 is a transverse cross-section of a shell construction particularly adapted for use in air filtration, such as in the embodiment shown in FIG. 5; and FIG. 8 is an elevation partly in cross-section of the shell construction shown in FIG. 7.

Figure 2A:
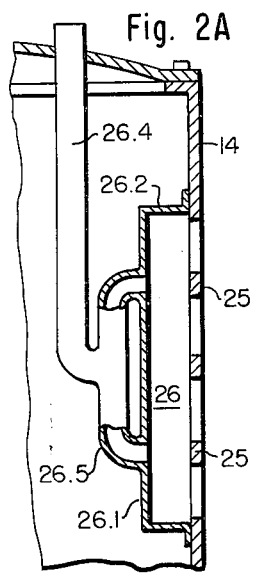
FIG. 2A is a sectional view of the blowback chamber and associated manifold conduit taken at 2A—2A of FIG. 2.
Figure 1:
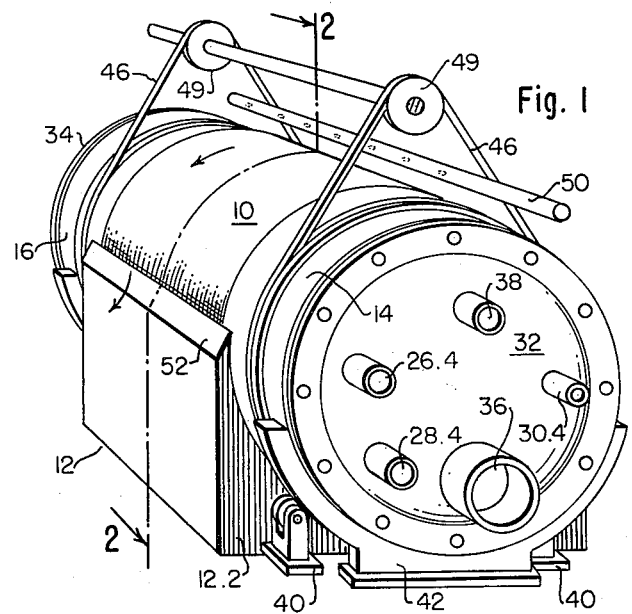
FIG. 1 is a perspective view of one preferred embodiment of a rotary filter constructed in accordance with this invention.

A rotary filter embodying this invention and constructed for the filtration of slurries of solid material suspended in a liquid is shown in FIGS. 1–4. The filter consists generally of a hollow cylindrical shell 10 mounted for rotation with a lower section submerged in a slurry tank 12. The shell 10 is formed with a surface adapted for filtration, for instance by being provided with separate adjacent longitudinal compartments, each communicating separately through perforations 11 with the interior of the shell, and a covering of filter cloth, as disclosed in greater detail in U.S. Patents 2,352,303 and 2,567,266.

At its opposite ends, the shell 10 engages front and back head members 14 and 16 respectively, each formed with a cylindrical surface mating with the inside surface of the shell 10. The head members are joined by longitudinal struts 18 and longitudinal blades 20, 21, 22, 23 and 24 each having outside surface portions formed in the same cylindrical surface as the head members to come in close proximity to the inner surface of the shell 10. Preferably, to provide additional internal support for the shell, a number of rings 25 connect with the struts and blades and also contact the inside surface of the shell.

Conveniently, the head members 14 and 16, struts 18, blades 20, 21, 22, 23 and 24, and rings 25 are formed from a single hollow cylinder, the outside surface of which is machined to mate with the inside surface of the shell 10, with the struts, blades and rings being formed by cutting out appropriate sections of the cylinder wall. In this manner the entire assembly member about which the interior structure of the filter is organized may be easily and inexpensively formed in a single machine turning operation.

At the interior of the shell 10 there is preferably provided one or more chambers each connecting with a conduit by which fluids are removed from or introduced into the chambers. Generally included are a blowback chamber 26 located where the filter cake is to be removed, an initial filtrate or cloudy port chamber 28 located where the clean filter surface first enters the slurry tank 12, and one or more wash water collection chambers 30.

Each of the chambers is formed of enclosing wall members fastened to the blades, the latter forming the edges of the chambers with the space between adjacent blades defining the area of the inside of the shell in communication with each chamber.

Figure 2B:
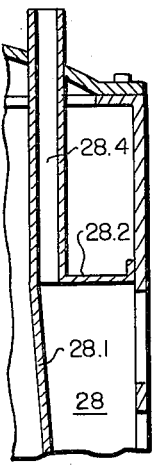
FIG. 2B is a sectional view of the initial filtrate chamber and associate conduit taken at 2B—2B of FIG. 2.
Figure 2:
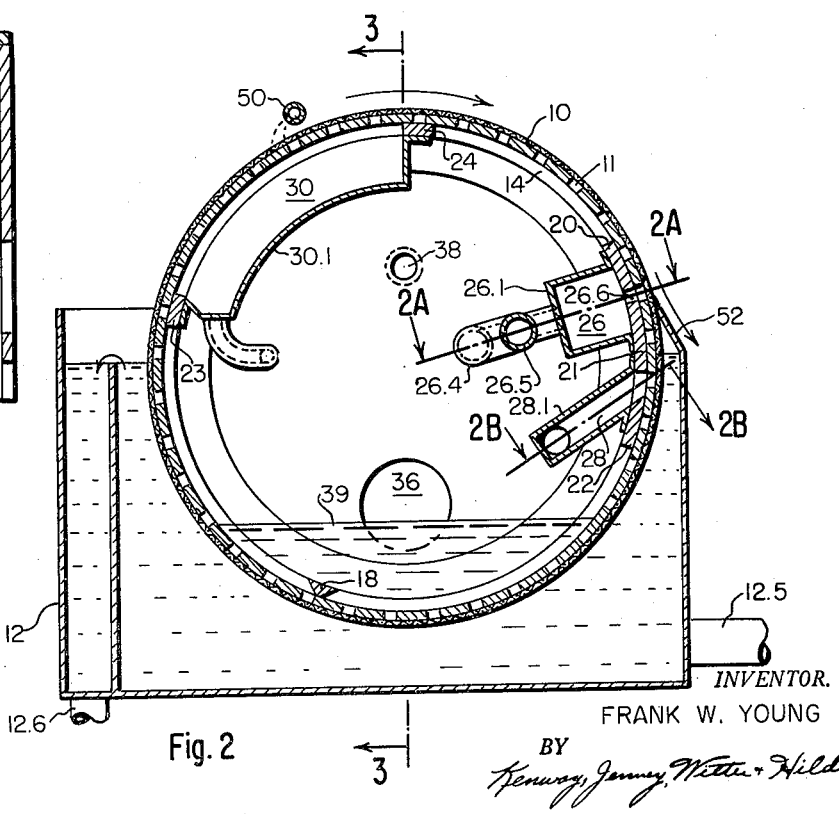
FIG. 2 is a transverse cross-sectional view taken at 2—2 of FIG. 1.
Figure 3:
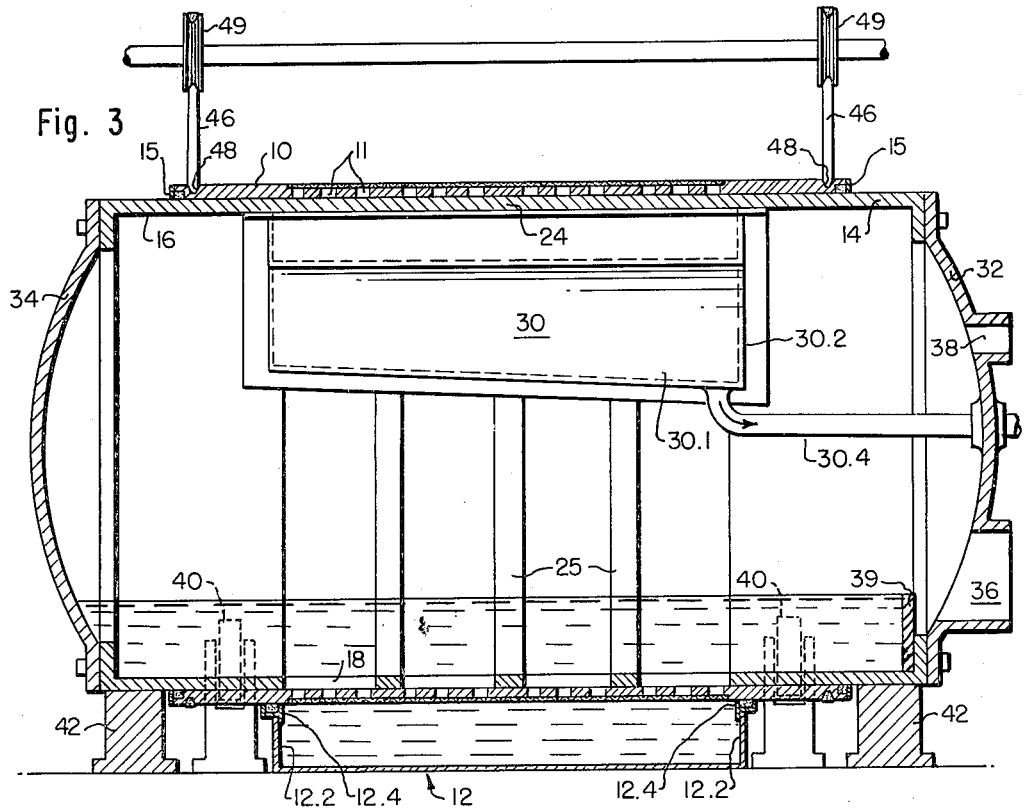
FIG. 3 is a longitudinal cross-section of the embodiment shown in FIG. 1 taken at 3—3 of FIG. 2.
Figure 4:
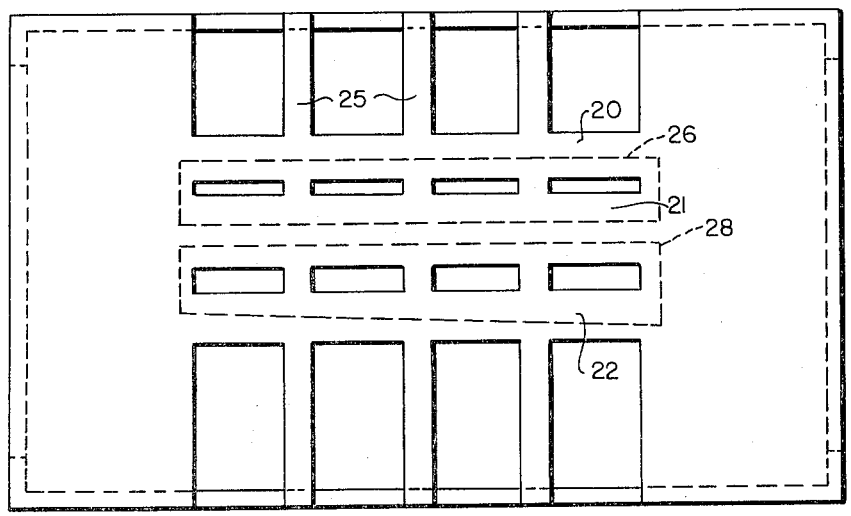
FIG. 4 is a longitudinal elevation of the central structure including the head members and the longitudinal blades forming the edge portions and supporting the blowback chamber and initial filtrate chamber.

The blowback chamber 26 is thus formed of wall members 26.1 defining its sides and bottom, and end members 26.2 defining its end, with the outer edges of the wall members 26.1 flanged and jointed to the blades 20 and 21, and the outer edges of the end members 26.2 flanged and joined to the inside of the head members 14 and 16, as best shown in FIGS. 2 and 2A. Connections to the blowback chamber are made through a blowback conduit 26.4 which connects through a blowback manifold 26.5 to the chamber 26 and leads outside the shell.

Similarly, the initial filtrate or cloudy port chamber 28 is formed of wall members 28.1 each flanged at their outer edges and joined to the blades 21 and 22, and end members 28.2 flanged at their outer ends and joined to the head members 14 and 16, as best shown in FIGS. 2 and 2B. This chamber is preferably formed to slope downwardly from the shell to provide proper drainage, and the upper edge of the lower blade 22 is preferably also downwardy bevelled for the same purpose. Drainage from the initial filtrate chamber is provided through a conduit 28.4 connecting through one of the end members 28.2, and leading out of the shell 10.

The wash water collection chamber is formed of wall members 30.1 shaped to provide an arcuate cross-section, and flanged at their edges and joined to blades 23 and 24. The ends are closed by end wall members 30.2 appropriately formed and flanged at their outer edges and joined to the inside of the head members 14 and 16. A drain conduit 30.4 connects with the bottom of the chamber through the wall members 30.1 and leads outside of the shell 10.

The entire interior of the shell is generally maintained at subatmospheric pressure and is accordingly enclosed by means of front and back head plates 32 and 34, respectively, with the front head plate 32 provided with a filtrate outlet connection 36 and a vacuum connection 38, each leading to the interior region at the interior of the shell 10. The conduits 26.4, 28.4 and 30.4 from the interior chambers extend through the front head member and terminate outside.

To maintain a tight seal between the shell 10 and head members 14 and 16, stuffing boxes 15 are provided at opposite edges of the shell 10.

A dam 39 across the front end of the head plate 14 adjacent the filtrate outlet 36 serves to regulate the depth of filtrate in the shell.

The entire filter shell assembly is mounted to submerge the lower part of the filter surface in this slurry tank 12. For this purpose, opposite end walls 12.2 of the tank 12 are formed with circular edges to accommodate the outer surface of the shell 10 which is then mounted to extend across the tank 12 with each end outside the tank. The edges of the tank in contact with the shell are formed with stuffing boxes 12.4 to assure a tight seal between the tank and shell. An appropriate inlet pipe 12.5 and overflow outlet 12.6 are provided to lead slurry to and from the slurry tank 12 and to permit continuous circulation of the slurry.

The shell is conveniently mounted for rotation on a pair of rollers 40 at each end just outside the tank, and the head members and remaining internal assembly are mounted on stanchions 42. The shell is thus at least partially supported by the rollers 40, but may be partially or even entirely supported on the head members 14 and 16. The shell 10 is rotatably driven by any appropriate means, conveniently by V-belts 46 running between grooves 48 provided in the outside of the shell, and drive pulleys 49.

Accessory equipment generally used in conjunction with the filter of this invention includes a wash water sprinkler 50 located to spray wash water on the filter cake opposite the wash water collection chamber 30, and a discharge chute 52 extending longitudinally along the filter shell opposite the blowback chamber 26.

In a typical filtration operation using the filter of the embodiment of this invention described above, the slurry tank 12 is filled with the slurry to be filtered, a vacuum is applied to the interior of the drum through the vacuum connection 38 and also to the wash water collection drain 30.4 and the initial filtrate drain 28.4. The shell 10 is then driven through the slurry, and the fluid pressure differential created by the internal vacuum coupled with the pressure of the slurry on the outside of the shell causes filtrate to permeate the filter surface and a filter cake to build up on the outside. The initial filtrate enters chamber 28 and drains out through conduit 28.4 which is also maintained under a vacuum. Filtrate permeating the drum below the initial filtrate chamber collects in the shell 10 and reaches the level of the top of the dam 39, then overflows and discharges through the filtrate outlet 36, which empties conveniently through a barometric leg or self-priming pump by which the internal vacuum may be maintained.

As the shell 10 continues its rotation the cake is carried out of the slurry and may then be sprayed with wash water from the sprinkler 50. With the wash water collection chamber 30 also maintained under a vacuum, the wash water is readily collected separately and flows out through the conduit 30.4. The cake is then subjected to the drying action of air being drawn through it in the area between the wash water collection chamber 30 and the point of removal at the discharge chute 52.

When the cake is to be discharged, air under a positive pressure is fed into the blowback chamber 26 through the blowback conduit 26.4 and manifold 26.5. This air discharges through the shell 10 in the area 26.6 located between the blades 20 and 21, and serves to lift the filter cake away from the filter surface, where it is picked up by the discharge chute 52. If desired, pulsating air pressure may be utilized in the blowback chamber in the manner disclosed in U.S. Patent No. 2,712,387.

The operation is continuous and may be carried out as long as slurry is fed to the slurry tank 12.

In comparison with prior art constructions, it will be seen that the filter construction of this invention has numerous advantages. The construction of the equipment is greatly simplified since all the internal chambers are supported on appropriately located blades, the outer surfaces of which provide the proper relationship to the inside of the shell and are machined most conveniently along with the outer surfaces of the head members 14 and 16 in a single operation. The blades in addition, provide a support for the chambers of increased sturdiness.

Because the head members are stationary, the various conduits feeding or draining the various chambers, as well as those leading to the interior of the shell may be located away from the center, to permit taking advantage of optimum fluid flow conditions and the utilization of gravity drainage throughout. In addition, the center region of the filter is left vacant and accessible, for instance through removal of the back head plate 34.

Piping problems are also further simplified since it is entirely feasible to use flexible hose as the conduits serving the various chambers.

Figure 5:
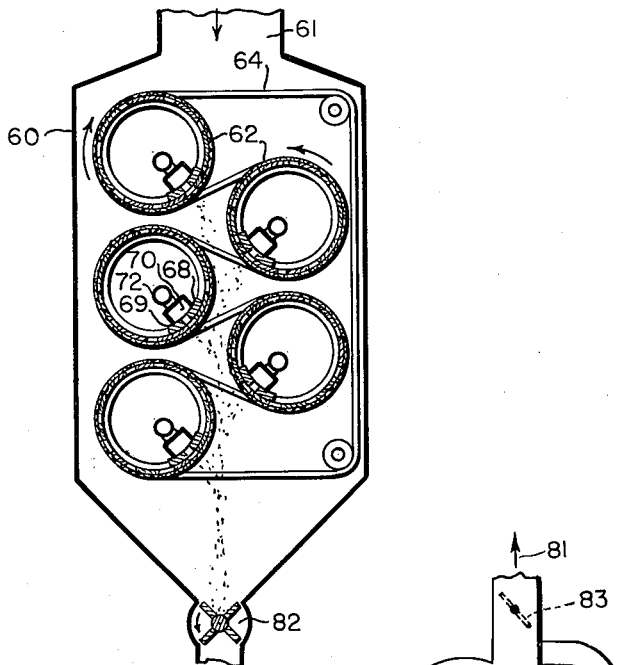
FIG. 5 is a transverse cross-sectional view of another embodiment of this invention adapted for the filtration of air.
Figure 6:
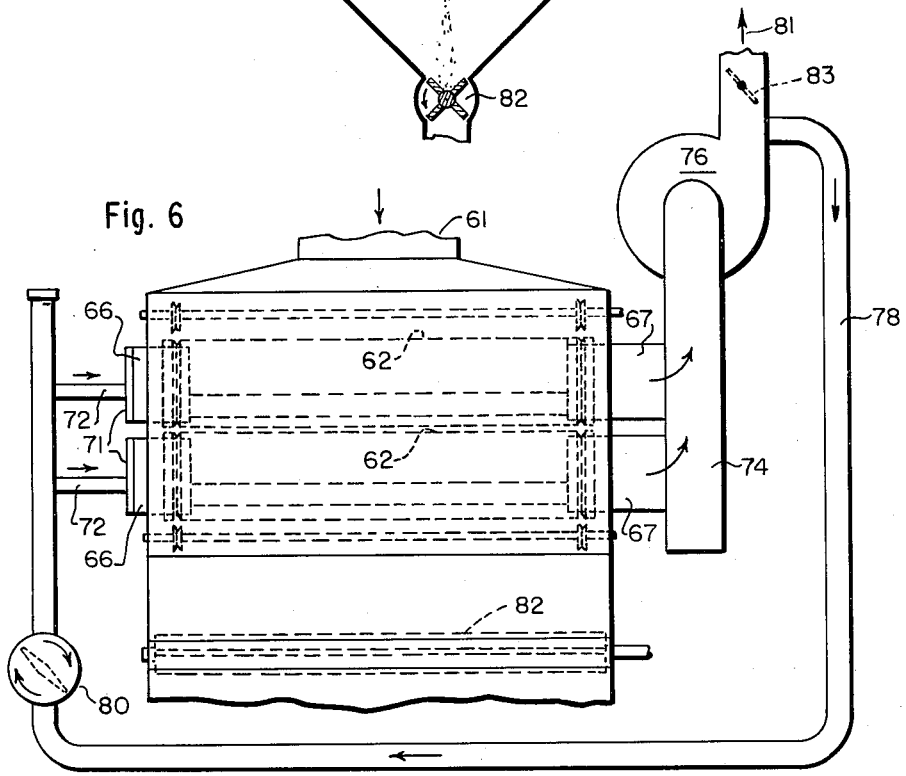
FIG. 6 is a side elevation of the embodiment shown in FIG. 5.

An embodiment of this invention adapted for the filtration of air is shown in FIGS. 5 and 6. In this apparatus, the air enters a filter chamber 60 in which are rotatably mounted several cylindrical filter shells 62 driven simultaneously by belts 64 engaging grooves at the ends of the shells. The shells 62 are mounted between head members 66 and 67 mounted in opposed pairs in opposite walls of the chamber, each pair being connected by several struts welded to the inside surfaces of the head members. A pair of the struts supports a blowback chamber 70 which is formed with external edge portions 69 contacting the inside surface of the shell 62.

One of each pair of head members 66 is closed by a plate 71 through which extends a blowback conduit 72 connecting to the corresponding blowback chamber 70, and the other of each pair of head members 67 connects directly to an outlet manifold 74. A blower 76 having its inlet connected to the outlet manifold 74 exhausts the filtered air from the filter as shown by arrow 81. By operation of valve 83, some of this clear air may be directed to a conduit 78 which connects through a pulsating valve 80, such as the type described in applicant's copending application, Serial No. 333,639 filed January 28, 1953 and now Patent No. 2,732,912 issued January 31, 1956, to the blowback conduits 72. In this manner, filtered pulsating air is supplied to the blowback chambers 70 to cause the filter cloth, forming the filter surface of each shell 62 to shake free the dust particles accumulated on it.

Thus, air enters the chamber 60, conveniently through an inlet 61 at the top, is then drawn through the filter surfaces of the several shells 62 rotating within the chamber and is finally exhausted dust-free through the blower 76. The pulsating air supplied to the blowback chambers 70 causes the dust accumulated on each shell 62 to be dislocated at near the bottom of the shell, and it then falls to the bottom of the chamber. The bottom is conveniently hopper-shaped and feeds into a star valve 82 through which the dust is discharged.

One presently preferred shell construction particularly adapted for air filtration is shown in FIGS. 7 and 8. The shell is a squirrel cage arrangement of outwardly slotted tubes 90 longitudinally mounted between end rings 92, one of which at least is perforated at the ends of the tubes 90 to permit the insertion and withdrawal of retaining rods 94 into and from the slotted tubes 90.

In view of the nature of air filtration, the shells may be of extremely light construction; for instance they may be of sheet steel, or they may be of the construction described in applicant's copending application, Ser. No. 333,639 filed January 28, 1953 and now Patent No. 2,732,912 issued January 31, 1956.

The shells 62 are supported on internal bearing rings 71 carried at the inside surface of the end rings 92, and the bearing rings 71 in turn ride on external bearing rings 73 carried at the outside surfaces of the head members 66 and 67. In this construction the struts 68 are slightly spaced from the inside surface of the shell. The blowback chamber 70, supported by the struts, is accordingly formed with an outwardly extending channel 70a leading to the edge portions 69 which contact the inside surface of the shell and permit the application of blowback pressure to the filter surface.

The filter cloth 95 is held in place by being tucked into the tubes 90 through the slots, and the rod 94 is then inserted into the tuck to hold the cloth in place.

Removable rim members 96 of generally the same inthernal diameter as the end rings 92 are clamped to the end rings. The rims 96 are conveniently formed with V-groves which engage the V-belts 64.

This construction is simple and inexpensive and provides a compartmentalized filtration surface admirably suited for the filtration of gases while being also useful for the filtration of liquids. It is light in weight and the cloth is easily removed for cleaning or replacement.

Although this invention has been described in detail with reference to presently preferred embodiments, it is contemplated that obvious modifications will readily occur to those skilled in the art and that such may be made without departing from the scope of this invention. For instance, for some applications it may be desirable to employ only one head member to support the shell, and to close the other end of the shell by a cover or plate which is carried by the shell to rotate with it. Such may obviously be done by bringing all the conduits through the stationary head member which would also support the desired number of blades extending in cantilever fashion outward from the head member proper.

The present application is a continuation-in-part of my copending application Ser. No. 530,111 filed August 23, 1955 and now abandoned.

Having thus disclosed my invention and described in detail preferred embodiments thereof, I claim and deside to secure by Letters Patent:

1. In a rotary vacuum filter of the type described, a hollow cylindrical shell mounted for rotation about its principal axis and having filtrate passages and a surface adapted for filtration, an internal structural member for said shell comprising an inner stationary cylinder having its outer surface substantially co-cylindrical with the internal surface of said shell, said inner cylinder being formed with end head member portions located at the ends of said shell and being cut out in central regions to define filtration areas with sections of the inner cylinder in the form of longitudinal spaced blades extending between the head member portions, said blades having outer surface areas adjacent to the inner surface of said shell and forming means maintaining a portion of said shell at a pressure higher than at the interior of said shell to permit removal of filter solids, and closures at the ends of said shell forming a pressure-tight enclosed region of the interior of said shell, one of said closures being mounted on one of said head member portions and having a filtrate outlet opening eccentric of and substantially below said axis, means for applying a vacuum to the interior of said shell and means for draining filtrate from said opening under vacuum.

2. In a rotary vacuum filter of the type described, a hollow cylindrical shell mounted for rotation about its principal axis and having filtrate passages and a surface adapted for filtration, an internal structural member for said shell comprising an inner stationary cylinder having its outer surface substantially co-cylindrical with the internal surface of said shell, said inner cylinder being formed with end head member portions located at the ends of said shell and being cut out in central regions to define filtration areas with sections of the inner cylinder in the form of longitudinal spaced blades extending between the head member portions, partitioning means defining an internal chamber within said internal structural member adjacent the internal surface of said shell for maintaining a portion of the surface of said shell at a pressure higher than at the interior of said shell to permit removal of filter solids, said means being attached to said blades with said blades forming edge portions thereof, and closures at the end of said shell forming a pressure-tight enclosed region of the interior of said shell, one of said closures being mounted on one of said head member portions and having a filtrate outlet opening eccentric of and substantially below said axis, means for applying a vacuum to the interior of said shell and means for draining filtrate from said opening under vacuum.

3. In a rotary vacuum filter of the type described, a hollow cylindrical shell mounted for rotation about its principal axis and having filtrate passages and a surface adapted for filtration, opposed stationary hollow cylindrical head members at the ends of said shell each of said head members having an outer surface in contact with the inner surface of said shell, spaced longitudinal blades integral with and connecting said head members, said blades having outer surface portions substantially co-cylindrical with said outer surfaces and adjacent to the internal surface of said shell, partitioning means defining an internal chamber within said shell adjacent its internal surface for maintaining a portion of the surface of said shell at a pressure higher than at the interior of said shell to permit removal of filter solids, said means being attached to said blades with said blades forming edge portions thereof, closures mounted on said head members and forming a pressure-tight enclosed region which includes the interior of said shell, one of said closures having a filtrate outlet opening eccentric of and substantially below the axis of said shell providing drainage from said enclosed region, second conduit means connecting with said chamber, means for applying a vacuum to said enclosed region, and means for draining filtrate from said opening under vacuum.

4. In a rotary vacuum filter of the type described; a hollow cylindrical filter shell, means mounting said shell for rotation about a horizontal axis and closing the interior of the shell to provide for maintaining a vacuum therein and for removing filtrate therefrom including stationary opposed closures forming head members at opposite ends of said shell and closing the interior of said shell, one of said closures having a filtrate outlet opening eccentric of and substantially below the axis of said shell, means for applying a vacuum to the interior of said shell, means for draining filtrate from said opening under vacuum, and means preventing application of the said vacuum to a portion of the surface of said shell to permit removal of filter solids, including a blade extending longitudinally between said closures and having an outer surface lying closely adjacent to the interior of said shell.

5. A continuous rotary gas filter comprising in combination a filter chamber having an inlet for gas to be filtered and an outlet at its bottom for solids separated from said gas, a valve in said outlet for removing solids from said chamber, a hollow cylindrical shell within said chamber having open ends and a surface adapted for filtration, means including an exhaust conduit for removing gas from the interior of said shell, a pair of opposed stationary hollow cylindrical head members having outside diameters substantially equal to the inside diameter of said shell closing the ends and supporting said shell for rotation, and at least one of said head members forming an outlet conduit communicating with said exhaust conduit, a longitudinal strut connecting said head members and lying parallel to the inside surface of said shell in proximity thereto, partitioning means supported by said strut defining a blowback chamber adjacent to the inside surface of said shell, and an inlet conduit for supply gas to said chamber.

References Cited in the file of this patent

UNITED STATES PATENTS

| Number | Name | Date |
|---|---|---|
| 550,353 | Parker | Nov. 26, 1895 |
| 690,030 | Parker | Dec. 31, 1901 |
| 869,720 | Matthias | Oct. 20, 1907 |
| 949,724 | Bebbington | Feb. 15, 1910 |
| 1,627,882 | Berry | May 10, 1927 |
| 2,052,156 | Young | Aug. 25, 1936 |
| 2,139,445 | Dinwiddie | Dec. 6, 1938 |
| 2,352,303 | Young | June 27, 1944 |
| 2,567,266 | Young | Sept. 11, 1951 |
| 2,744,633 | Saunders | May 8, 1956 |
| 2,751,086 | Borjeson | June 19, 1956 |